United States Patent
Chen et al.

(10) Patent No.: US 8,723,826 B2
(45) Date of Patent: May 13, 2014

(54) ENERGY SAVING TYPE TOUCH-CONTROLLED LIQUID CRYSTAL DISPLAY DEVICE

(75) Inventors: Shih Hsiang Chen, Shenzhen (CN); Jiahe Cheng, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 206 days.

(21) Appl. No.: 13/379,903

(22) PCT Filed: Nov. 16, 2011

(86) PCT No.: PCT/CN2011/082276
§ 371 (c)(1),
(2), (4) Date: Dec. 21, 2011

(87) PCT Pub. No.: WO2013/071497
PCT Pub. Date: May 23, 2013

(65) Prior Publication Data
US 2013/0120284 A1    May 16, 2013

(30) Foreign Application Priority Data
Nov. 15, 2011   (CN) .......................... 2011 1 0361739

(51) Int. Cl.
*G06F 3/041* (2006.01)

(52) U.S. Cl.
USPC .......................... 345/173; 345/174; 178/18.01

(58) Field of Classification Search
USPC ...................... 345/173, 174; 178/18.01–18.11
See application file for complete search history.

(56) References Cited

U.S. PATENT DOCUMENTS

| 6,473,072 | B1 * | 10/2002 | Comiskey et al. | 345/173 |
| 6,491,457 | B2 * | 12/2002 | Ahmed | 400/477 |
| 2007/0257634 | A1 * | 11/2007 | Leschin et al. | 320/107 |
| 2009/0096759 | A1 * | 4/2009 | Nishiwaki et al. | 345/173 |

* cited by examiner

*Primary Examiner* — Koosha Sharifi-Tafreshi

(57) ABSTRACT

The present invention discloses an energy saving type touch-controlled liquid crystal display device. The energy saving type touch-controlled liquid crystal display device has a liquid crystal panel with a touch-sensing function and a piezo-electric film. The piezoelectric film senses the pressure applied to the liquid crystal panel and generates electric power. The electric power is then stored in a battery module for relative electric components to utilize, and thereby accomplishes an object of energy saving.

6 Claims, 2 Drawing Sheets

ENERGY SAVING TYPE TOUCH-CONTROLLED LIQUID CRYSTAL DISPLAY DEVICE

FIELD OF THE INVENTION

The present invention relates to a liquid crystal display device, and more particularly to an energy saving type touch-controlled liquid crystal display device.

BACKGROUND OF THE INVENTION

The liquid crystal display devices in the present market are all powered by external sources. AC utility power is transformed and converted into a lower voltage DC power, and then is input to the liquid crystal display device for direct usage or is stored in a battery of the device.

With the global warming effects being stronger, an energy-saving function for an electronic device has become more important, and energy-saving designs for products are in urgent need. It has been considered to power a liquid crystal display using any kinds of energy-saving means. However, liquid crystal display devices in the present market are still unable to meet such requirement.

Hence, it is necessary to provide an energy saving type touch-controlled liquid crystal display device to overcome the problems existing in the conventional technology.

SUMMARY OF THE INVENTION

The present invention provides an energy saving type touch-controlled liquid crystal display device to solve the problem that the conventional liquid crystal display device cannot effectively reduce energy consumption.

In view of the shortcomings described in the prior art, a primary object of the invention is to provide an energy saving type touch-controlled liquid crystal display device that converts the mechanical energy into electric energy during user operation and then utilizes the electric energy to reduce the power consumption.

To achieve the above object, the present invention provides an energy saving type touch-controlled liquid crystal display device which comprises:

a liquid crystal panel having a touch-controlled assembly mounted therein to provide a touch-sensing surface in a display area thereof;

a piezoelectric film sensing a pressing force applied to the touch-sensing surface to generate electric power; and a battery module connected to the piezoelectric film and the liquid crystal panel, saving the electric power generated by the piezoelectric film and providing the electric power to the liquid crystal panel.

In one embodiment of the present invention, the liquid crystal panel comprises an upper substrate and a lower substrate; and the piezoelectric film is mounted between the upper substrate and the lower substrate.

In one embodiment of the present invention, the upper substrate is a color filter substrate and the lower substrate is a thin-film transistor array substrate.

In one embodiment of the present invention, further comprises a backlight module; the liquid crystal panel is mounted on the backlight module with a bottom surface thereof; and the piezoelectric film is mounted on the bottom surface of the liquid crystal panel.

In one embodiment of the present invention, further comprises a protection layer; the protection layer is mounted on a top surface of the liquid crystal panel; and the piezoelectric film is mounted between the protection layer and the liquid crystal panel.

The present invention mainly utilizes a piezoelectric material to convert mechanical energy into electric energy during user touch operation, and store the electric energy in a battery, and with transmission circuits, the electric energy can be transmitted to electric components for usage, and thereby saves the electric power consumed from external power source to accomplish the object of saving energy.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
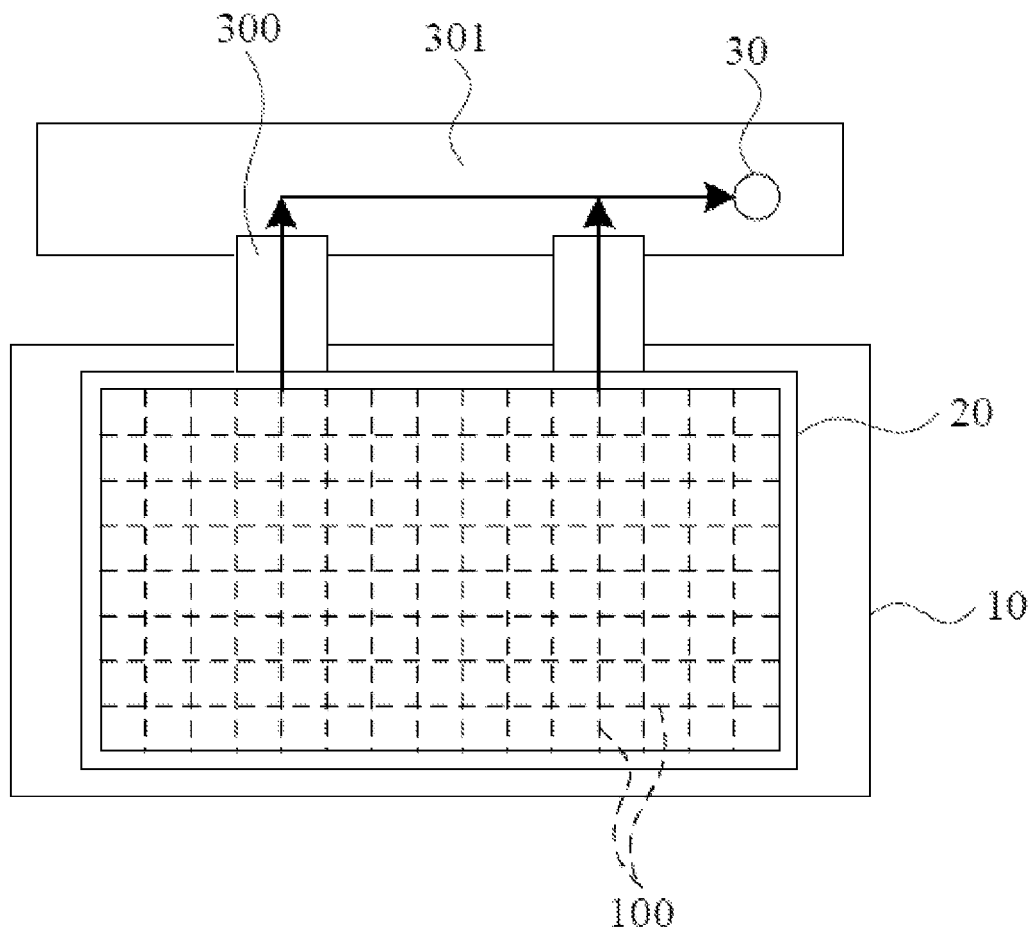
FIG. 1 is a schematic plan view of a first preferred embodiment of an energy saving type touch-controlled liquid crystal display device in accordance with the present invention.

With reference to FIG. 1, FIG. 1 is a schematic plan view of a first preferred embodiment of an energy saving type touch-controlled liquid crystal display device. The energy saving type touch-controlled liquid crystal display device of the present invention comprises a liquid crystal panel 10, a piezoelectric film 20 and a battery module 30.

The liquid crystal panel 10 has a touch-controlled assembly mounted therein to provide a touch-sensing surface 100 in a display area thereof.

The piezoelectric film 20 is used to sense a user's pressing force applied to the touch-sensing surface 100 of the liquid crystal panel 10. Since the electric dipole moment of the piezoelectric film 20 is shortened due to the strain, and in order to resist this change, the piezoelectric film 20 will generate electric power to maintain its original status.

The battery module 30 is connected to the piezoelectric film 20 and stored the electric power generated by the piezoelectric film 20. In this embodiment, the piezoelectric film 20 is connected to the battery module 30 on a circuit board 301 through a flexible printed circuit board 300.

When a user makes a touch operation, with his finger or stylus pressing on the touch-sensing surface 100 of the liquid crystal panel 10, the piezoelectric film 20 will sense the change in pressure and generate electric power accordingly, the electric power then is transmitted through the flexible printed circuit board 300 to the battery module 30 on the circuit board 301 to be stored. When the electric components of the touch-controlled liquid crystal display device works, the battery module 30 can offer the electric power to the electric components and thereby reduces the consumption of external power source.

Figure 2:
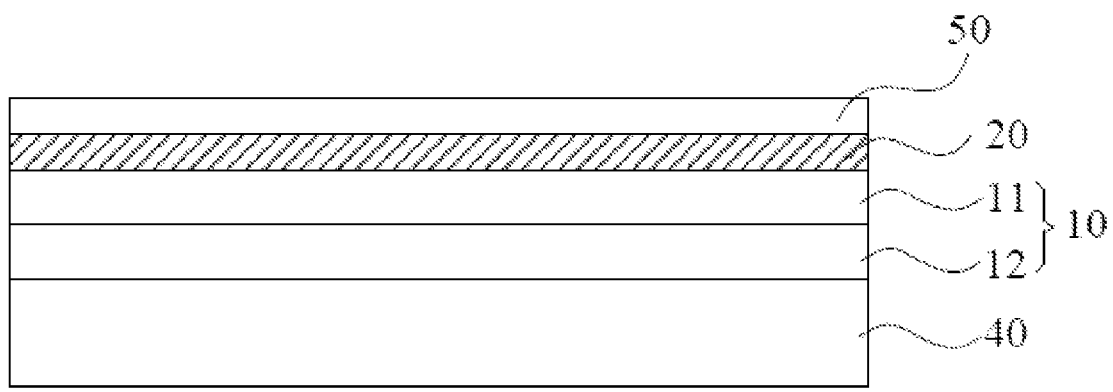
FIG. 2 is a cross-sectional side view of the first preferred embodiment of the energy saving type touch-controlled liquid crystal display device in accordance with the present invention.

With reference to FIG. 2, FIG. 2 is a cross-sectional side view of the first preferred embodiment of the energy saving type touch-controlled liquid crystal display device in accordance with the present invention. The energy saving type touch-controlled liquid crystal display device further comprises a backlight module 40 and a protection layer 50. The liquid crystal panel 10 is mounted on the backlight module 40 with a bottom surface thereof; and the protection layer 50 is mounted on a top surface of the liquid crystal panel 10. Furthermore, the liquid crystal panel 10 includes an upper substrate 11 and a lower substrate 12. The upper substrate 11 is preferably a color filter substrate, and the lower substrate 12 is preferably a thin-film transistor array substrate.

The piezoelectric film 20 can be mounted in different positions in the touch-controlled liquid crystal display device based on requirements. In the embodiment in FIG. 2, the piezoelectric film 20 is mounted between the protection layer 50 and the liquid crystal panel 10.

Figure 3:
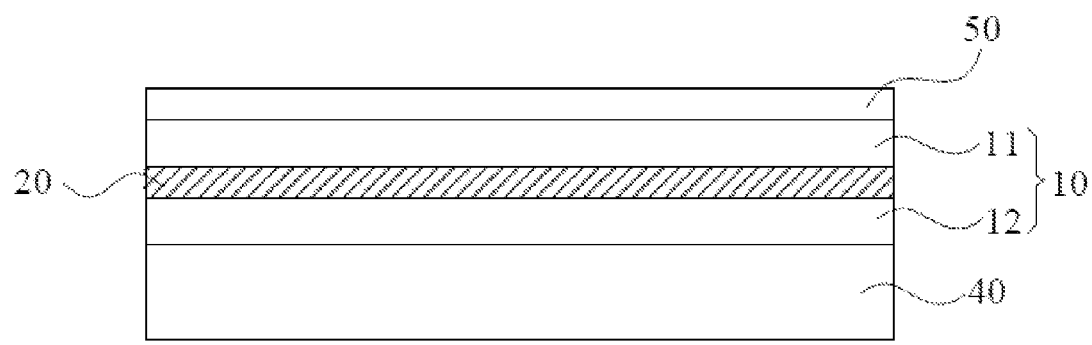
FIG. 3 is a cross-sectional side view of a second preferred embodiment of the energy saving type touch-controlled liquid crystal display device in accordance with the present invention.

With reference to FIG. 3, FIG. 3 is a cross-sectional side view of a second preferred embodiment of the energy saving type touch-controlled liquid crystal display device in accordance with the present invention. Being different from the embodiment in FIG. 2, in the embodiment in FIG. 3, the piezoelectric film 20 is mounted between the upper substrate 11 and the lower substrate 12.

Figure 4:
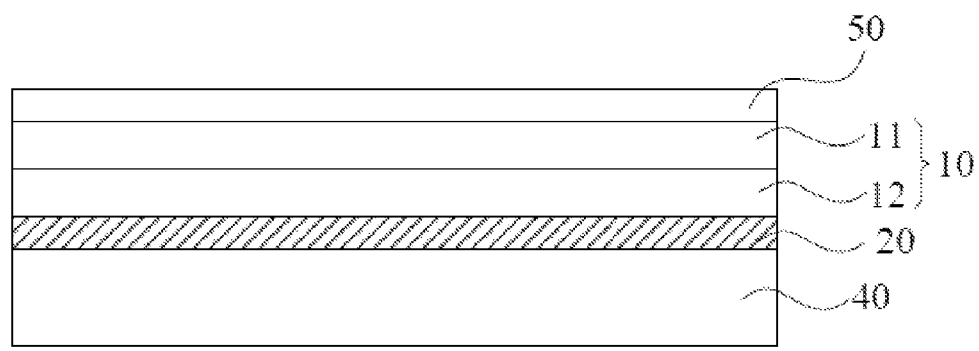
FIG. 4 is a cross-sectional side view of a third preferred embodiment of the energy saving type touch-controlled liquid crystal display device in accordance with the present invention.

With reference to FIG. 4, FIG. 4 is a cross-sectional side view of a third preferred embodiment of the energy saving type touch-controlled liquid crystal display device in accordance with the present invention. Being different from the embodiments in FIGS. 2 and 3, in the embodiment in FIG. 4, the piezoelectric film 20 is mounted on a bottom surface of the liquid crystal panel 10 to be disposed between the liquid crystal panel 10 and the backlight module 40.

From the above description, comparing with the conventional touch-controlled liquid crystal display device that only relies on an external power source for operating; the present invention utilizes piezoelectric materials to convert mechanical energy into electric power during the user touch operation and stores the electric power in a battery. The electric power of the battery can be transmitted through circuit to the electric components of the touch-controlled liquid crystal display device so as to reduce the usage on the electric power provided by the external power source, and thereby accomplishes the object of energy saving.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. An energy saving type touch-controlled liquid crystal display device, characterized in that: the energy saving type touch-controlled liquid crystal display device comprises:
    a liquid crystal panel having a touch-controlled assembly mounted therein to provide a touch-sensing surface in a display area thereof, and the liquid crystal panel comprises a color filter substrate and a thin-film transistor array substrate;
    a protection layer mounted on a top of the liquid crystal panel;
    a piezoelectric film mounted between the protection layer and the liquid crystal panel, sensing a pressing force applied to the touch-sensing surface to generate electric power; and
    a battery module connected to the piezoelectric film and the liquid crystal panel, saving the electric power generated by the piezoelectric film and providing the electric power to the liquid crystal panel.

2. An energy saving type touch-controlled liquid crystal display device, characterized in that: the comprising:
    a liquid crystal panel having a touch-controlled assembly mounted therein to provide a touch-sensing surface in a display area thereof;
    a piezoelectric film sensing a pressing force applied to the touch-sensing surface to generate electric power; and
    a battery module connected to the piezoelectric film and the liquid crystal panel, saving the electric power generated by the piezoelectric film and providing the electric power to the liquid crystal panel.

3. The energy saving type touch-controlled liquid crystal display device as claimed in claim 2, characterized in that: the liquid crystal panel comprises an upper substrate and a lower substrate; and the piezoelectric film is mounted between the upper substrate and the lower substrate.

4. The energy saving type touch-controlled liquid crystal display device as claimed in claim 2, characterized in that: the upper substrate is a color filter substrate and the lower substrate is a thin-film transistor array substrate.

5. The energy saving type touch-controlled liquid crystal display device as claimed in claim 2, characterized in that: the liquid crystal panel is mounted on the backlight module with a bottom surface thereof; and the piezoelectric film is mounted on the bottom surface of the liquid crystal panel.

6. The energy saving type touch-controlled liquid crystal display device as claimed in claim 2, characterized in that: further comprises a protection layer; the protection layer is mounted on a top surface of the liquid crystal panel; and the piezoelectric film is mounted between the protection layer and the liquid crystal panel.

* * * * *